(12) United States Patent
Ewert

(10) Patent No.: US 11,427,213 B2
(45) Date of Patent: Aug. 30, 2022

(54) METHOD FOR OPERATING AN AUTONOMOUS VEHICLE, AND AUTONOMOUS VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/972,591

(22) PCT Filed: Jun. 8, 2019

(86) PCT No.: PCT/EP2019/065053
§ 371 (c)(1),
(2) Date: Dec. 6, 2020

(87) PCT Pub. No.: WO2020/015923
PCT Pub. Date: Jan. 23, 2020

(65) Prior Publication Data
US 2021/0237752 A1    Aug. 5, 2021

(30) Foreign Application Priority Data
Jul. 19, 2018   (DE) .......................... 102018212025.0

(51) Int. Cl.
*B60W 50/038*   (2012.01)
*B60W 30/09*    (2012.01)
(Continued)

(52) U.S. Cl.
CPC .......... *B60W 50/038* (2013.01); *B60W 30/09* (2013.01); *B60W 50/023* (2013.01);
(Continued)

(58) Field of Classification Search
CPC .. B60W 30/09; B60W 50/023; B60W 50/045; B60W 2050/0295;
(Continued)

(56) References Cited

U.S. PATENT DOCUMENTS 9,315,178 B1    4/2016  Ferguson et al.
10,185,999 B1 * 1/2019  Konrardy .............. G07C 5/008
(Continued)

FOREIGN PATENT DOCUMENTS

DE   112014001059 T5   11/2015
DE   102014210147 A1   12/2015
(Continued)

OTHER PUBLICATIONS

International Search Report for PCT/EP2019/065053, dated Aug. 26, 2019.

*Primary Examiner* — Marthe Y Marc-Coleman
(74) *Attorney, Agent, or Firm* — Norton Rose Fulbright US LLP; Gerard Messina

(57) ABSTRACT

A method for operating an autonomous vehicle. The method includes the transmission of status data to a processing unit, which is independent of the autonomous vehicle, using a wireless communications link. The method furthermore includes monitoring of the function of the autonomous vehicle by the independent processing unit while taking the status data into account, and when a malfunction of the autonomous vehicle is detected, the independent processing unit determines target data for guiding the autonomous vehicle to a stopping position. The target data are transmitted to the autonomous vehicle, and the autonomous vehicle is guided to the stopping position with the aid of the target data. A position of the autonomous vehicle is determined using signals from the wireless communications link and is taken into account when determining the target data.

11 Claims, 3 Drawing Sheets

(51) Int. Cl.
*B60W 50/023* (2012.01)
*B60W 50/04* (2006.01)
*G07C 5/00* (2006.01)
*B60W 50/029* (2012.01)

(52) U.S. Cl.
CPC ........... B60W 50/045 (2013.01); G07C 5/008 (2013.01); *B60W 2050/0295* (2013.01); *B60W 2050/046* (2013.01); *B60W 2556/55* (2020.02); *B60W 2556/60* (2020.02)

(58) Field of Classification Search
CPC ....... B60W 2050/046; B60W 2556/55; B60W 2556/60; B60W 2050/0297; B60W 2556/45; B60W 2556/65; B60W 50/029; G07C 5/008; G08G 1/096775; G08G 1/096725; G08G 1/096766; G08G 1/20; G05D 1/0011; G05D 1/0027; G05D 1/0033; G05D 1/0291; G05D 1/096725
See application file for complete search history.

(56) References Cited

U.S. PATENT DOCUMENTS

| | | | |
|---|---|---|---|
| 2009/0292459 A1* | 11/2009 | Zuccotti | G08G 1/096716 |
| | | | 701/532 |
| 2015/0158499 A1 | 6/2015 | Koravadi | |
| 2016/0103450 A1* | 4/2016 | Hogenmueller | B60W 30/00 |
| | | | 701/23 |
| 2016/0351056 A1 | 12/2016 | Herbach et al. | |
| 2018/0373268 A1* | 12/2018 | Antunes Marques Esteves | |
| | | | G05D 1/0291 |
| 2019/0318041 A1* | 10/2019 | Bai | G06F 16/9024 |

FOREIGN PATENT DOCUMENTS

| | | |
|---|---|---|
| DE | 102014220781 A1 | 4/2016 |
| DE | 102015003124 A1 | 9/2016 |
| DE | 102015208621 A1 | 11/2016 |
| DE | 102015214521 A1 | 2/2017 |
| DE | 102015223429 A1 | 6/2017 |
| DE | 102016002603 A1 | 9/2017 |

* cited by examiner

METHOD FOR OPERATING AN AUTONOMOUS VEHICLE, AND AUTONOMOUS VEHICLE

FIELD

The present invention relates to a method for operating an autonomous vehicle in which malfunctions of the autonomous vehicle are detected and the autonomous vehicle is brought to a stopping position when a malfunction is detected. Additional aspects of the present invention relate to an autonomous vehicle and to an independent processing unit, which is set up for use with the present method, and to computer programs, which are set up to execute the steps of the method to be carried out by the autonomous vehicle or by the independent processing unit when the computer programs are running on a computer.

BACKGROUND INFORMATION

Autonomous vehicles are vehicles that manage without a driver. The vehicle drives autonomously, for instance, by independently detecting the course of the road, other road users and/or obstacles, calculates control commands according to the detected data and forwards the data to actuators in the vehicle. Via the actuators, both the longitudinal guidance, i.e., the acceleration and braking of the vehicle, as well as the transverse guidance, i.e. the steering of the vehicle, are then assumed.

In order to ensure a safe operation of such an autonomous vehicle, the correct functioning of all components of the vehicle has to be monitored, and if an error occurs, the vehicle must be brought to a safe state.

German Patent Application No. DE 2015 003 124 A1 describes a method and a device for operating a vehicle featuring an automated driving operation. During the normal function of the automated driving operation, it is provided to ascertain and store an emergency setpoint trajectory on a continuous basis.

When an error event arises, this emergency trajectory forms the basis of an automated trajectory control, and the vehicle is guided according to this emergency trajectory until the vehicle is at a standstill.

German Patent Application No. DE 11 2014 001 059 T5 describes a device and a method for controlling an autonomous vehicle exhibiting a fault. Via a communications link, the autonomous vehicle is in contact with a control center or with other vehicles. The control center distributes tasks to the autonomous vehicles. The autonomous vehicles have a processor unit, which processes and analyzes sensor signals and is able to generate a fault signal on the basis of rules. Based on the fault signal, the processor unit of the vehicle is subsequently able to carry out an action such as park the vehicle at a particular location.

German Patent Application No. DE 2015 208 621 A1 describes a locating device for a motor vehicle. To determine the position of an object such as a vehicle key in relation to the vehicle, a WLAN transceiver can be installed in the key. The signals from the WLAN transceiver are received by an antenna in the vehicle. If greater distances are involved, a network-based technology such as mobile radio telephony can be used for the locating.

The conventional methods have the disadvantage that the detection of a malfunction of an autonomous vehicle may take so long that the vehicle may already have strayed from its traffic lane, for instance because the vehicle is driving blindly in the event of a sensor failure until the error is detected. A redundant control unit of the vehicle may then possibly no longer be able to compensate for an erroneously chosen direction of the vehicle with the result that an accident may occur.

Another disadvantage of the conventional methods is that if an emergency braking operation is initiated after a fault has been detected, the vehicle is unable to be accurately kept within its lane because the current position and the movement direction of the vehicle may possibly not be known. Despite the initiation of an emergency braking operation, undesired lane changes can thus occur, resulting in accidents.

Another problem with the conventional methods is that the achievement of a safe stopping position may possibly require a lane change, but because the positions of other road users are unknown, in particular in a failure of the sensors of the vehicle, the stopping position may possibly be reached only while endangering other road users, as the case may be.

SUMMARY

A method for operating an autonomous vehicle is provided. In accordance with an example embodiment of the present invention, the method includes the transmission of status data to a processing unit, which is independent of the autonomous vehicle, using a wireless communications link, and monitoring the function of the autonomous vehicle by the independent processing unit while taking the status data into account. When a malfunction of the autonomous vehicle is detected, the independent processing unit determines target data for guiding the autonomous vehicle to a stopping position. The target data are transmitted to the autonomous vehicle, and the autonomous vehicle is guided to the stopping position with the aid of the target data. In this context, it is furthermore provided to determine a position of the autonomous vehicle while determining signals from the wireless communications link and to take it into account when determining the target data.

The position of the autonomous vehicle in particular may already be determined by the independent processing unit when monitoring the function of the autonomous vehicle and additionally or alternatively may also be carried out when a malfunction of the autonomous vehicle is detected.

The determination of the position of the autonomous vehicle with the aid of the signals from the wireless communications link is preferably based on the signals themselves and not on position data transmitted by the signals in the form of status data. For example, the independent processing unit may consider for this purpose a signal strength of the signals, a propagation time of the signals and/or a direction from which the signals are received. If the independent processing unit receives the signals at multiple locations, then an evaluation of the signal strengths and/or propagation times with the aid of lateration makes it possible to determine the position of the autonomous vehicle relative to the locations where the signals are received by the independent processing unit.

The status data may particularly be performance data of the environment sensors of the autonomous vehicle and/or performance data pertaining to the control units used in the autonomous vehicle. The status data are selected such that they allow an inference of the operational capability of the sensors, the control units and possibly of further units such as actuators of the autonomous vehicle. In addition, the status data may particularly include a current position and a movement direction determined by the autonomous vehicle as well as information about the type of autonomous vehicle.

The current position of the autonomous vehicle was determined with the aid of environment sensors or a satellite navigation system, for instance.

Preferably, a regular, cyclical transmission of the status data takes place via the wireless communications link. In order to allow for the fastest possible detection of malfunctions, the interval for the transmission is selected to be as short as possible, for instance in the range of 2 ms to 100 ms, preferably in the range of 5 ms to 10 ms.

The independent processing unit in particular involves a computer device, which is functionally and physically separated from the autonomous vehicle. As a result, the independent processing unit is situated neither in nor on the autonomous vehicle and is not involved in the execution of the autonomous driving in a normal operation.

The wireless communications link could be any wireless communications link that is capable of transmitting data. For example, mobile telephony networks such as GSM, UMTS or LTE mobile telephony networks may be used for this purpose, or also other communications methods such as WLAN or Bluetooth.

The monitoring of the function of the autonomous vehicle by the independent processing unit preferably takes place in real time, which means that the transmission of the status data is processed without delay at the lowest possible latency. For example, an error may be inferred in the process if the performance or the operational capability of sensors of the autonomous vehicle drops below a predefined limit value or, for example, if the malfunction of components required for the autonomous driving function, e.g., a control unit, sensors or actuators, is reported. Moreover, malfunctions of the autonomous vehicle are able to be detected indirectly in that a setpoint trajectory, i.e. a setpoint position and a setpoint movement direction of the autonomous vehicle, is determined based on transmitted status data and compared with the position determined with the aid of the wireless communications link. In this way, the independent processing unit is also able to detect errors of an autonomous vehicle that the systems integrated into the autonomous vehicle are incapable of detecting.

The independent processing unit preferably also determines the stopping position to which the autonomous vehicle is to be guided in the event of a malfunction preferably. Stopping positions that do not put other road users at risk are preferably selected, such as a stopping position at the edge of a road or traffic lane.

The target data preferably include a trajectory along which the autonomous vehicle is safely able to reach the stopping position. Alternatively or additionally, the target data may include control commands for actuators of the autonomous vehicle, which cause the autonomous vehicle to be safely guided to the stopping position along a trajectory when the control commands are executed by the actuators.

The independent processing unit preferably uses a software module for generating the trajectory or for generating the control commands, which is adapted to the respective autonomous vehicle. The software module may be a computer program for providing an autonomous driving function. In particular, the software module may be an artificial intelligence such as in the form of a trained neural network, which provides the autonomous driving function. In addition or as an alternative, a map stored in the independent processing unit is used for generating the trajectory.

Corresponding software modules for all types of autonomous vehicles are preferably stored in the independent processing unit. The independent processing unit preferably also includes at least one general software module that is not adapted to a specific type of autonomous vehicle and thus is able to be used if no specially adapted software module is available. Such a general software module in particular is configured to determine a trajectory for guiding the autonomous vehicle to the stopping position on the basis of a map stored in the independent processing unit as well as the determined position of the autonomous vehicle.

For the selection of the required software component for determining the target data, the transmitted status data preferably include a vehicle ID via which the independent processing unit is able to identify the autonomous vehicle or the type of autonomous vehicle.

The independent processing unit preferably is a server or a Cloud computing service. Both a server and a Cloud computing service are able to make contact with the autonomous vehicle using a wireless communication device. The wireless communication device may include a connection to a general communications infrastructure such as the Internet, the autonomous vehicle being reachable via a wireless Internet connection. Moreover, it is also possible to use other means for the wireless communication, e.g., a direct radio link between the autonomous vehicle and the independent processing unit.

As an alternative to an embodiment of the independent processing unit as a server or a Cloud computing service, the independent processing unit may be part of a further vehicle that is located within a predefined distance from the autonomous vehicle. The further vehicle may likewise be an autonomous vehicle.

The predefined distance, for example, may be given by the maximum range of a wireless communications link between the autonomous vehicle and the further vehicle. In addition, it is possible to fixedly specify the distance such as a maximum distance in the range of 50 to 500 m, or to determine the distance in a dynamic manner based on the current vehicle velocity.

A software component, which is called up by the further vehicle via a wireless communications link from a server or a Cloud computing service, is preferably used to generate the target data. The software component is stored by the further vehicle for as long as it is needed and preferably is then deleted again. For example, the deletion may take place when a distance between the autonomous vehicle and the further vehicle enlarges to such an extent that the further vehicle is located outside the predefined distance from the autonomous vehicle.

A communications link is used for the call-up of a software component specifically adapted to the autonomous vehicle to be controlled. If such a communications link is unavailable, for instance because the autonomous vehicle and the further vehicle are located in a rural area where the mobile radio telephony network is not fully built up, then it is possible to utilize a general software component already stored in the independent processing unit. This general software component may possibly not be able to generate an adapted control command for actuators of the autonomous vehicle, but it can certainly ascertain a trajectory via which the vehicle may safely be guided to the stopping position.

As an alternative or in addition to the use of a software component adapted to the autonomous vehicle, the independent processing unit is able to realize a trajectory on the basis of a map stored in the processing unit and on the basis of the determined position of the autonomous vehicle relative to the independent processing unit or relative to the further vehicle. The further vehicle is able to determine its own position with the aid of its own sensors and/or with the aid of a satellite navigation system, for instance. In this case, the thereby determined trajectory is preferably transmitted to the autonomous vehicle as target data.

When the independent processing unit detects a malfunction of the autonomous vehicle, a warning is preferably transmitted to other vehicles in the environment of the autonomous vehicle. In this way further vehicles in the environment are able to adapt their own response appropriately, e.g., by enlarging safety distances or by planning evasive maneuvers.

The warning, which is transmitted to other vehicles in the environment, may preferably also include the target data which were determined by the independent processing unit for the guidance of the autonomous vehicle. In this way the other vehicles are informed of the type of driving maneuver the autonomous vehicle will likely perform.

Preferably, after receipt of the evasion trajectories, the other vehicles in the environment are appropriately set up to execute an evasive maneuver that corresponds to the evasion trajectory. In an advantageous manner, the independent processing unit coordinates all of the evasive maneuvers of the other vehicles and also the guidance of the autonomous vehicle to the stopping position so that the risk of endangering road users is reduced.

The independent processing unit preferably determines positions of other vehicles in the environment of the autonomous vehicle, and the positions of the other vehicles in the environment are taken into account when the target data are determined and/or are used for determining evasive trajectories for the other vehicles in the environment.

The determination of the positions of other vehicles in the environment of the autonomous vehicle is preferably also carried out with the aid of signals from a wireless communications link which exists between the independent processing unit and the other vehicles in the environment.

When the position of the autonomous vehicle is determined and possibly when the positions of other vehicles in the environment of the autonomous vehicle are determined, further data sources are preferably considered as well. For example, the respective vehicles are able to determine their positions with the aid of satellite navigation and/or by using their own sensors and transmit the positions to the independent processing unit. It is additionally possible, for example, to use sensors of the other vehicles or the further vehicle in order to be able to precisely determine the position of the autonomous vehicle in the event of a fault.

Another aspect of the present invention is to provide an autonomous vehicle, which includes a control unit and redundant actuators which are designed to execute autonomous driving maneuvers. In this context, it is provided that the autonomous vehicle furthermore includes at least a wireless communications device and is set up for use with one of the methods described herein.

The control unit of the vehicle is designed to generate control commands in response to data pertaining to the environment of the autonomous vehicle, which are executed by the actuators of the vehicle. Actuators which implement the transverse guidance, i.e., the steering of the vehicle, are provided and also actuators which implement the longitudinal guidance, i.e. the acceleration and deceleration of the vehicle. For reasons of safety, redundant actuators, which maintain the general function in a malfunction of the respective main actuator, are preferably provided in each case.

It is preferably provided that the autonomous vehicle has an emergency current supply, which is designed to maintain the supply of current of at least the redundant actuators as well as the wireless communications device in the event of a failure of the onboard power supply network of the autonomous vehicle. This ensures that the autonomous vehicle is able to receive certain target data from the independent processing unit in the event of a fault, which the redundant actuators are then able to implement. As a result, a stopping position is reachable in a safe manner even in a fault case.

The wireless communications device of the autonomous vehicle is preferably designed to establish a wireless Internet connection via a mobile telephony network such as GSM, UMTS or LTE, or to establish a direct radio link to the independent processing unit.

Another aspect of the present invention is to provide an independent processing unit, which includes a wireless communication device with an autonomous vehicle and a computer device. The independent processing unit is preferably configured for use with one of the methods described herein.

For instance, the independent processing unit is designed as a server or as a Cloud server, but it may also be part of a control unit of a further vehicle. The wireless communication device, for example, may be designed to establish a wireless Internet connection via a mobile telephony network or be designed as a connection to other communications devices such as the Internet.

According to an example embodiment of the present invention, computer programs are also provided. With the aid of a first computer program, the steps of the methods described herein and to be executed by the autonomous vehicle are carried out when the computer program is executed on a programmable computer device. Accordingly, a second computer program is used for carrying out the steps of one of the methods described herein that are to be executed by the independent processing unit when the computer program is executed on a programmable computer device.

The computer programs may be stored on a machine-readable memory medium such as on a permanent or rewritable memory medium or be allocated to a computer device, or be stored on a removable CD-ROM, DVD, Blu-Ray disc or a USB stick. In addition or as an alternative, the computer programs are able to be provided on a computer device, e.g., on a server for downloading, e.g., via a data network such as the Internet or a communications link such as a telephone line or a wireless connection.

The example method, the example autonomous vehicle, the example independent processing unit as well as the example computer programs make it possible to ensure a safe control of an autonomous vehicle in the event of a fault.

The present method is suitable for the safe control of an autonomous vehicle in various fault scenarios such as defects of environment sensors, of central processing units or power failures. In all of these fault cases, the present invention makes it possible to safely guide the autonomous vehicle to a stopping position from the outside. It is particularly advantageous in this context that the position of the vehicle is able to be located independently of the systems of the autonomous vehicle and that control commands are determined independently of processing units and control units of the defective autonomous vehicle.

In an advantageous manner, a defective autonomous vehicle therefore does not head blindly for a safe stopping position but can be monitored the entire time. In further advantageous embodiments of the present method, positions of further road users such as especially other vehicles in the environment are taken into account as well. If required, the other vehicles in the environment are also able to be guided by the provided independent processing unit so that they can perform evasive maneuvers in a manner coordinated with the movement of the defective autonomous vehicle. An endangerment of road users by the guidance of the autonomous vehicle to the stopping position is therefore advantageously avoided.

Moreover, through a comparison of a setpoint position of the autonomous vehicle with a position determined via the locating using the signals from the wireless communications link, it is advantageously possible to detect deviations, and thus an error, in a timely manner so that the independent processing unit is able to intervene quite early, and thus preferably prior to the departure from a traffic lane, through the transmission of target data suitable for guiding the vehicle.

In an advantageous manner, the target data are determined using an appropriate software module, which is preferably identical with the software module used by the autonomous vehicle during a normal operation. This therefore enables the independent processing unit to plan particularly precise trajectories, or even to address the actuators of the vehicles directly using corresponding control commands.

BRIEF DESCRIPTION OF THE DRAWINGS

Exemplary embodiments of the present invention are shown in the figures and described in greater detail below.

DETAILED DESCRIPTION OF EXAMPLE EMBODIMENTS

Figure 1:
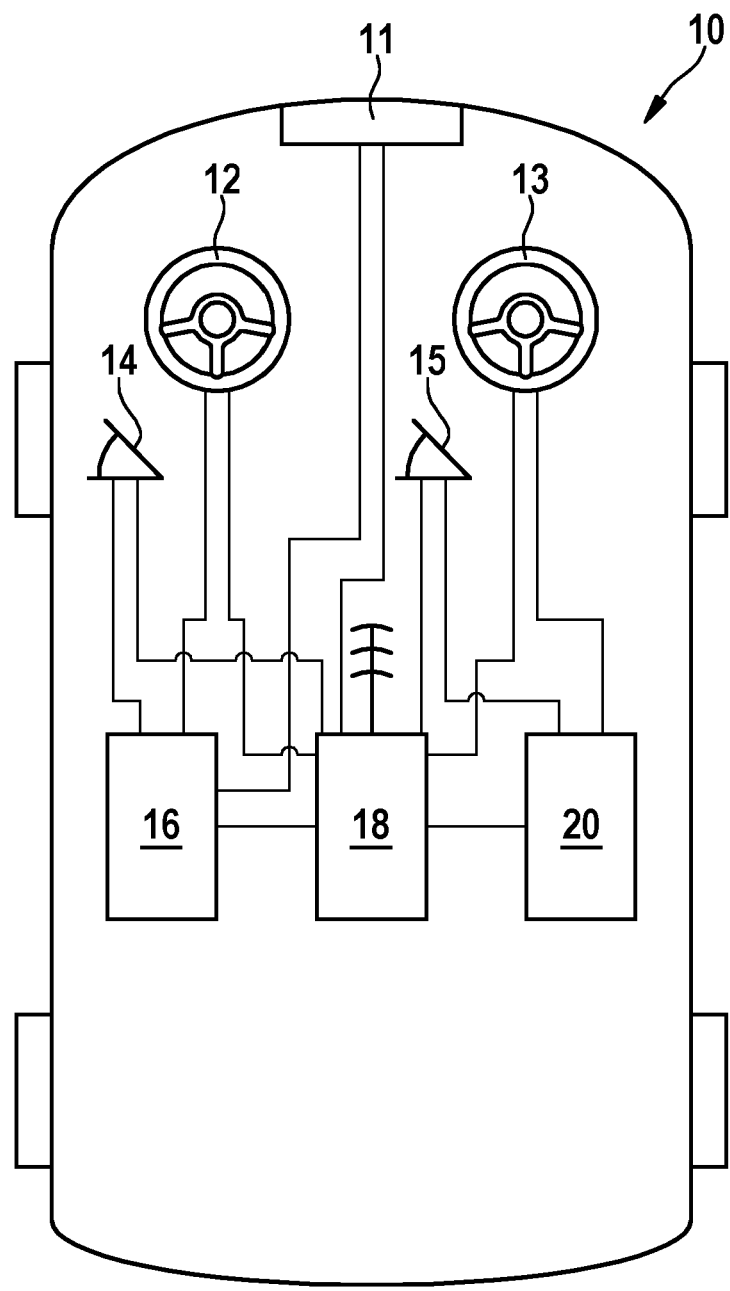
FIG. 1 shows a schematic illustration of an autonomous vehicle, in accordance with an example embodiment of the present invention.

In the following description of the exemplary embodiments of the present invention, identical components and elements are denoted by the same reference numerals and a repeated description of these components or elements is dispensed with in individual cases. The figures represent the subject matter of the present invention merely schematically.

FIG. 1 shows an autonomous vehicle 10, which is designed to carry out autonomous driving maneuvers, which means that autonomous vehicle 10 is capable of being operated without a driver. In order to execute autonomous driving maneuvers, autonomous vehicle 10 includes a sensor 11 for sensing the environment. A first actuator 12 is provided for steering autonomous vehicle 10, and a second actuator 14 is provided for assuming the longitudinal control, i.e. the acceleration and deceleration. Both first actuator 12 and second actuator 14 and sensor 11 are connected to a control unit 16. Control unit 16 analyzes data from sensor 11 pertaining to the environment of autonomous vehicle 10 and generates control commands for actuators 12 and 14. For reasons of safety, a first redundant actuator 13 and a second redundant actuator 15 are provided. First redundant actuator 13 assumes the transverse control of autonomous vehicle 10 if first actuator 12 fails. Accordingly, second redundant actuator 15 is designed to assume the longitudinal control of autonomous vehicle 10 in the event of a malfunction of second actuator 14.

Figure 2:
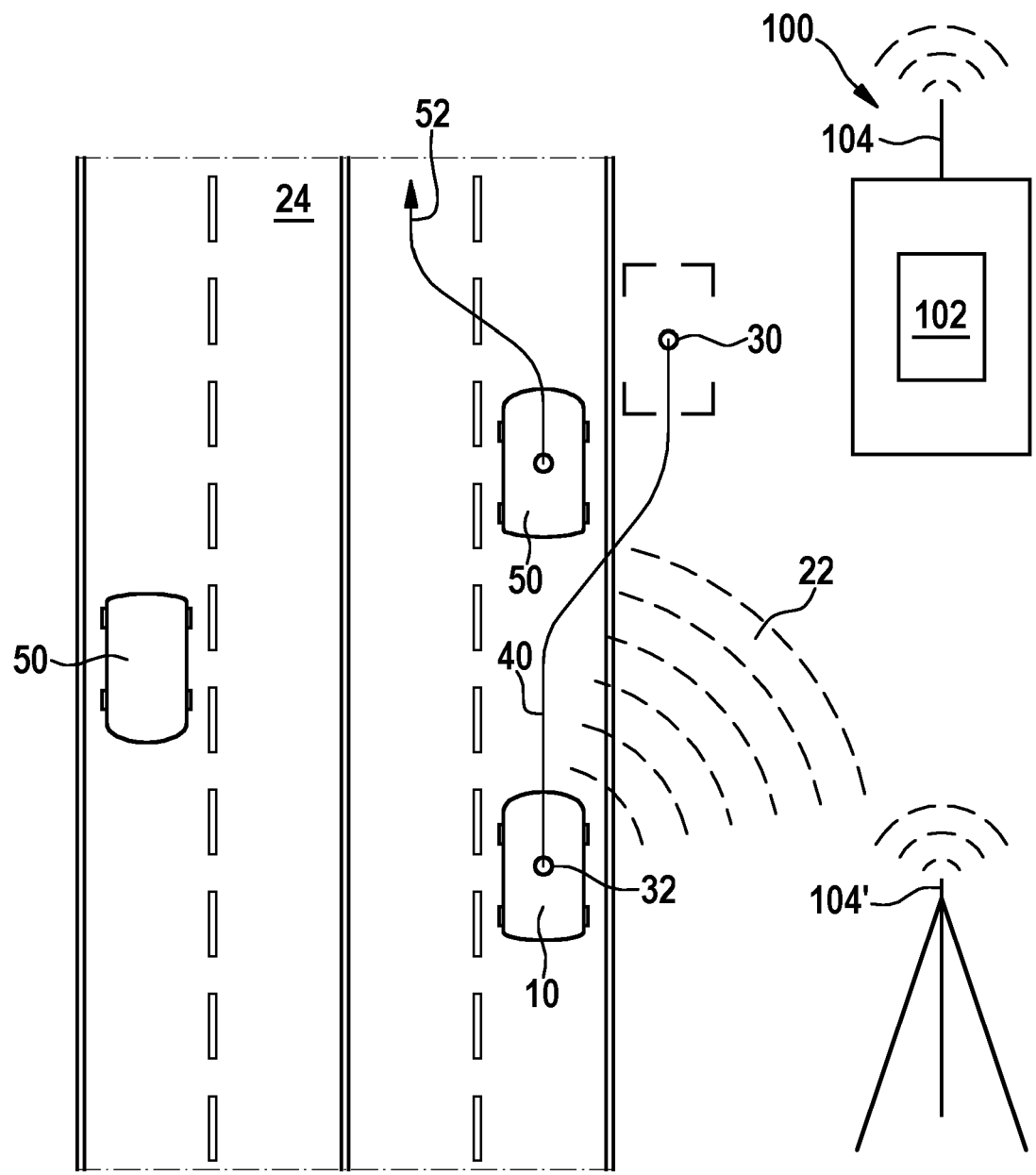
FIG. 2 shows the guidance of a defective autonomous vehicle by a server of a central device, in accordance with an example embodiment of the present invention.
Figure 3:
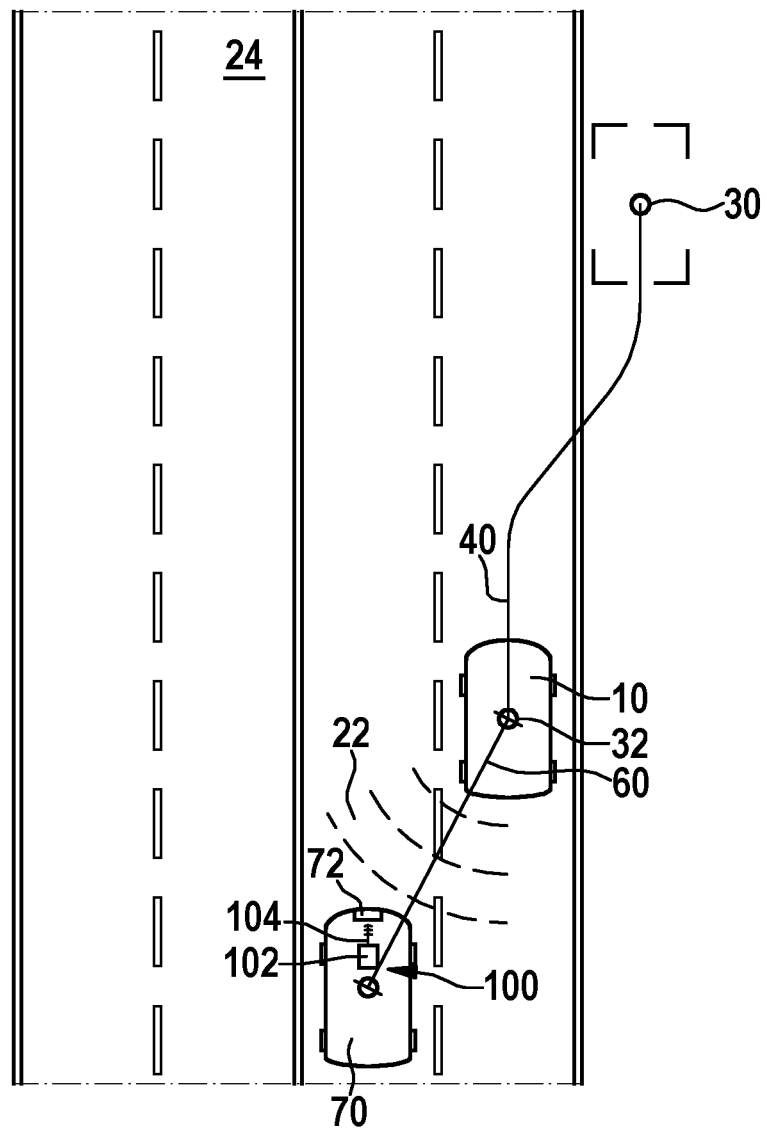
FIG. 3 shows the guidance of a defective autonomous vehicle by a further vehicle, in accordance with an example embodiment of the present invention.

Autonomous vehicle 10 furthermore includes a wireless communications device 18, which is designed to communicate with an independent processing unit 100, see FIGS. 2 and 3. Wireless communications device 18 is connected to actuators 12 and 14, to redundant actuators 13 and 15, control unit 16 as well as to sensor 11. Wireless communications device 18 receives performance data from all components of autonomous vehicle 10, which makes it possible to infer the operational capability of the respective component. For example, wireless communications device 18 in particular receives data about the current operational capability of sensor 11, the function of control unit 16 as well as the functional capability of actuators 12 and 14 and also of redundant actuators 13 and 15. Wireless communications device 18 transmits these performance data as status data to independent processing unit 100.

If independent processing unit 100 detects an error of autonomous vehicle 10 or of a component of autonomous vehicle 10, then wireless communications device 18 receives target data from independent processing unit 100. Depending on the type of error that has occurred, the target data may include a trajectory 40 based on which autonomous vehicle 10 is able to reach a stopping position 30 in a safe manner, see FIGS. 2 and 3, or they include corresponding control commands for actuators 12 and 14 and/or redundant actuators 13 and 15.

For example, if only sensor 11 is damaged or not sufficiently operative for the safe operation of autonomous vehicle 10 due to certain conditions in the environment, then the target data may include a trajectory 40, for example. Wireless communications device 18 transmits this trajectory 40 to control unit 16, which prepares corresponding control commands for actuators 12 and 14 and/or redundant actuators 13 and 15 and safely guides autonomous vehicle 10 along this trajectory 40 to stopping position 30.

Autonomous vehicle 10 preferably also includes an emergency current supply 20, which is able to maintain the supply of energy to at least wireless communications device 18 as well as redundant actuators 13 and 15 even in the event of a malfunction of an onboard current network of autonomous vehicle 10. If a malfunction of the onboard current network of autonomous vehicle 10 occurs, this will be detected by independent processing unit 100, which then prepares target data which include control commands for redundant actuators 13 and 15. These target data are transmitted to wireless communications device 18, which then forwards them to redundant actuators 13 and 15. Redundant actuators 13 and 15 carry out the control commands so that autonomous vehicle 10 safely reaches stopping position 30.

FIG. 2 shows a road 24 on which autonomous vehicle 10 is traveling. Autonomous vehicle 10 is connected to independent processing unit 100 via its wireless communications device 18, see FIG. 1.

Independent processing unit 100 includes a computer device 102 as well as communication device 104. In the example illustrated in FIG. 2, for instance, computer device 102 is a server, which may be set up in a central device, for example. Computer device 102 is in contact with communication device 104. Communication device 104 is designed for a wireless communication with autonomous vehicle 10 and implemented as a connection to a mobile telephony network, for example. This mobile telephony network may include a multitude of transmission devices as indicated by antenna 104'.

Autonomous vehicle 10 transmits status data to independent processing unit 100 at short time intervals of 5 ms, for example. For instance, these status data may include performance data of sensor 11 as well as status information or performance data of actuators 12 and 14, redundant actuators 13 and 15 as well as of control unit 16. In addition, the status data in this case include a current position of autonomous vehicle 10, for example, as well as the speed and the direction in which autonomous vehicle 10 is heading.

Independent processing unit 100 analyzes the received status data, which particularly may include a check whether the performance of sensor 11, see FIG. 1, is adequate to safely control autonomous vehicle 10.

In the specific embodiment of the method illustrated in FIG. 2, it is additionally provided that independent processing unit 100 continuously ascertains the position of autonomous vehicle 10 in an independent manner. For this purpose, signals 22 from the wireless communication between autonomous vehicle 10 and independent processing unit 100 are analyzed. If, as in the example illustrated in FIG. 2, signals 22 are received from antenna 104' as well as from the communication device 104, then a trilateration is able to be performed, where the distance of autonomous vehicle 10 from antenna 104' or from communication device 104 is determined by the propagation time of signals 22.

In the example illustrated in FIG. 2, processing unit 100 has detected that autonomous vehicle 10 exhibits a fault. For example, this may be accomplished in that deviations are identified in a comparison between the position transmitted by autonomous vehicle 10 via the status data and the actual position ascertained independently thereof by independent processing unit 100.

Independent processing unit 100 then determines a stopping position 30, which is located at the right edge of road 24, as well as a trajectory 40 using which autonomous vehicle 10 is able to be guided to stopping position 30 starting from a reference point 32 on autonomous vehicle 10. Preferably, a relative coordinate system that is related to reference point 32 is used in trajectory 40. At the same time, independent processing unit 100 determines the position of other vehicles 50 in the environment of autonomous vehicle 10. If these are located in the vicinity of autonomous vehicle 10 or in the vicinity of planned trajectory 40, independent processing unit 100 determines an evasive trajectory 52, which is transmitted to the respective other vehicle 50. Other vehicle 50 is then able to perform an evasive maneuver according to evasive trajectory 52 so that it will not be endangered by autonomous vehicle 10. In an advantageous manner, independent processing unit 100 coordinates the movement of all other vehicles 50 located in the vicinity so that autonomous vehicle 10 is safely able to be guided along trajectory 40 to stopping position 30. Despite the defect of autonomous vehicle 10, safe stopping, and thus a safe transfer of defective autonomous vehicle 10 to a safe state, is possible without putting other road users at risk.

FIG. 3 also shows an autonomous vehicle 10, which is traveling on a road 24. However, in the situation depicted in FIG. 3, no permanently installed infrastructure is available so that, for example, no communication is possible via a mobile telephony network with a central server or a Cloud service. In the situation shown in FIG. 3, a control unit of a further vehicle 70 therefore serves as a computer device 102 of an independent processing unit 100, which is able to monitor and control autonomous vehicle 10. To this end, further vehicle 70 also has communication device 104, which in this case are preferably designed to establish a direct radio link to autonomous vehicle 10. This may be realized in the form of a WLAN connection, for example.

As described above with reference to FIG. 2, autonomous vehicle 10 regularly transmits status data to independent processing unit 100 located in further vehicle 70. For example, if it determines a failure of sensor 11, see FIG. 1, of autonomous vehicle 10, then autonomous vehicle 10 is located using signals 22 from the wireless communication between autonomous vehicle 10 and further vehicle 70, and possibly using an environment sensor 72 of further vehicle 70, and its position is accurately determined. Independent processing unit 100 once again determines target data which are transmitted to autonomous vehicle 10. These target data, for example, include control commands for redundant actuators 13, 15, see FIG. 1, of autonomous vehicle 10, which induce autonomous vehicle 10 to drive along trajectory 40 to stopping position 30 starting from reference point 32.

In the example illustrated in FIG. 3, independent processing unit 100 of further vehicle 70 was selected for monitoring autonomous vehicle 10 because a distance 60 between autonomous vehicle 10 and further vehicle 70 lies below a predefined maximum distance. This maximum distance is selected so that a reliable radio communication is possible between autonomous vehicle 10 and further vehicle 70.

Because no connection to a communications infrastructure exists in the situation illustrated in FIG. 3, independent processing unit 100 in this example utilizes a general software module, which is stored in independent processing unit 100, for preparing a trajectory 40. In order to determine trajectory 40 by which autonomous vehicle 10 is able to be guided to stopping position 30, this general software module uses a map likewise stored in independent processing unit 100 and the position of autonomous vehicle 10 relative to further vehicle 70 ascertained with the aid of the present method. This trajectory 40 is then transmitted as target data to autonomous vehicle 10.

In the specific embodiment shown in FIG. 3, monitoring of autonomous vehicle 10 is advantageously also able to be ensured when no permanently installed infrastructures are present. For example, a safe operation of an autonomous vehicle 10 is therefore also possible in rural or remote areas where no or only insufficient coverage by mobile telephony networks is available.

The present invention is not restricted to the exemplary embodiments and the emphasized aspects described therein. Instead, a multitude of variations is possible within the scope of the present invention.

What is claimed is:

1. A method for operating an autonomous vehicle, the method comprising the following steps:
   transmitting status data to a processing unit, which is independent of the autonomous vehicle, using a wireless communications link;
   monitoring a function of the autonomous vehicle by the independent processing unit while taking the status data into account;
   detecting a malfunction of the autonomous vehicle;
   based on the detecting of the malfunction, determining, by the independent processing unit, target data for guiding the autonomous vehicle to a stopping position;
   transmitting the target data to the autonomous vehicle, the autonomous vehicle being guided to the stopping position using the target data; and
   determining a position of the autonomous vehicle using signals from the wireless communications link, the determined position being taken into account when determining the target data,
   wherein the independent processing unit is part of a further vehicle that is located within a predefined distance from the autonomous vehicle.

2. The method as recited in claim 1, wherein the target data include a trajectory along which the autonomous vehicle is safely able to reach the stopping position, or the target data include control commands for actuators of the autonomous vehicle, which cause the autonomous vehicle to be safely guided to the stopping position along a trajectory when the control commands are executed by the actuators.

3. The method as recited in claim 1, wherein the independent processing unit is a server or is provided by a Cloud computing service.

4. The method as recited in claim 1, wherein: (i) a software component, which is called up by the further vehicle via a wireless communications link from a server or a Cloud computing service, is used to generate the target data, and/or (ii) a map is used to generate the target data, which is stored in the independent processing unit.

5. The method as recited in claim 1, wherein when the malfunction of the autonomous vehicle is detected, a warning is transmitted to other vehicles in an environment of the autonomous vehicle.

6. The method as recited in claim 1, wherein positions of other vehicles in an environment of the autonomous vehicle are determined, and the positions of the other vehicles in the environment are taken into account when the target data are determined and/or are used for determining evasive trajectories for the other vehicles in the environment.

7. An autonomous vehicle, comprising:
a control unit and redundant actuators, which are set up to execute autonomous driving maneuvers;
at least one wireless communications device;
the autonomous vehicle configured to:
transmit status data to a processing unit, which is independent of the autonomous vehicle, using the wireless communications link, the independent processing unit configured to monitor a function of the autonomous vehicle while taking the status data into account, and when a malfunction of the autonomous vehicle is detected, determine target data for guiding the autonomous vehicle to a stopping position, and transmit the target data to the autonomous vehicle, the autonomous vehicle being guided to the stopping position using the target data, wherein a position of the autonomous vehicle using signals from the wireless communications link, the determined position being taken into account when determining the target data,
wherein the independent processing unit is part of a further vehicle that is located within a predefined distance from the autonomous vehicle.

8. The autonomous vehicle as recited in claim 7, wherein the autonomous vehicle has an emergency current supply which is configured to supply at least the redundant actuators as well as the wireless communications device with current in a malfunction of the onboard power supply network of the autonomous vehicle.

9. An independent processing unit, comprising:
a wireless communication device configured for wireless communication with an autonomous vehicle via a wireless communication link, wherein the independent processing unit is independent of the autonomous vehicle; and
a computer device;
wherein the independent processing unit is configured to:
receive status data using the wireless communications link;
monitoring a function of the autonomous vehicle while taking the status data into account;
when a malfunction of the autonomous vehicle, determine target data for guiding the autonomous vehicle to a stopping position, transmit the target data to the autonomous vehicle, the autonomous vehicle being guided to the stopping position using the target data, wherein a position of the autonomous vehicle is determined using signals from the wireless communications link, the determined position being taken into account when determining the target data,
wherein the independent processing unit is part of a further vehicle that is located within a predefined distance from the autonomous vehicle.

10. A non-transitory machine-readable memory medium on which is stored a computer program for operating an autonomous vehicle, the computer program, when executed by a computer of the autonomous vehicle, causes the computer to perform the following steps:
transmitting status data to a processing unit, which is independent of the autonomous vehicle, using a wireless communications link, the independent processing unit: monitoring a function of the autonomous vehicle, when a malfunction of the autonomous vehicle is detected, determining target data for guiding the autonomous vehicle to a stopping position, and transmitting the target data to the autonomous vehicle, the autonomous vehicle being guided to the stopping position using the target data, wherein a position of the autonomous vehicle is determined using signals from the wireless communications link, the determined position being taken into account when determining the target data,
wherein the independent processing unit is part of a further vehicle that is located within a predefined distance from the autonomous vehicle.

11. A non-transitory machine-readable memory medium on which is stored a computer program for operating an autonomous vehicle, the computer program, when executed by a computer of an independent processing unit, which is independent of the autonomous vehicle, causes the computer to perform the following steps:
receiving status data of the autonomous vehicle using a wireless communications link;
monitoring a function of the autonomous vehicle by the independent processing unit while taking the status data into account;
detecting a malfunction of the autonomous vehicle;
based on the detecting of the malfunction, determining target data for guiding the autonomous vehicle to a stopping position;
transmitting the target data to the autonomous vehicle, the autonomous vehicle being guided to the stopping position using the target data; and
determining a position of the autonomous vehicle using signals from the wireless communications link, the determined position being taken into account when determining the target data,
wherein the independent processing unit is part of a further vehicle that is located within a predefined distance from the autonomous vehicle.

* * * * *